US012811964B2

(12) United States Patent
Calkins et al.

(10) Patent No.: US 12,811,964 B2
(45) Date of Patent: Nov. 24, 2026

(54) AUTOMATED DETECTION OF CREDENTIAL THEFT AND NETWORK ERRORS USING CHANNEL CHANGE SEQUENCE ENTROPY METRICS

(71) Applicant: Charter Communications Operating, LLC, St. Louis, MO (US)

(72) Inventors: Jeffrey E. Calkins, Evergreen, CO (US); Kei Y. Foo, Englewood, CO (US); Srilal M. Weerasinghe, Parker, CO (US); Vipul Patel, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 374 days.

(21) Appl. No.: 18/675,700

(22) Filed: May 28, 2024

(65) Prior Publication Data

US 2025/0373635 A1 Dec. 4, 2025

(51) Int. Cl.
*G06N 20/00* (2019.01)
*G06F 21/10* (2013.01)
*H04L 9/40* (2022.01)

(52) U.S. Cl.
CPC ........ *H04L 63/1425* (2013.01); *G06F 21/107* (2023.08)

(58) Field of Classification Search
None
See application file for complete search history.

(56) References Cited

U.S. PATENT DOCUMENTS

2002/0129368 A1* 9/2002 Schlack ........... H04N 21/44016 348/E7.071
2003/0093792 A1* 5/2003 Labeeb ............ H04N 21/26283 725/38

OTHER PUBLICATIONS

L. E. Raileanu et al., "Theoretical Comparison between the Gini Index and Information Gain Criteria", Annals of Mathematics and Artificial Intelligence 41, pp. 44-93, 2004, DOI: 10.1023/B:AMAI.0000018580.96245.c6.
A. Howedi et al., "An Entropy-Based Approach for Anomaly Detection in Activities of Daily Living in the Presence of a Visitor", Entropy. 22. 845., pp. 1-20, Jul. 2020, DOI: 10.3390/e22080845.

* cited by examiner

*Primary Examiner* — David R Vincent
(74) *Attorney, Agent, or Firm* — Young Basile Hanlon & MacFarlane, P.C.

(57) ABSTRACT

Methods and systems for automated detection of credential theft and network errors using channel change sequence entropy metrics. A method includes determining, by an automated channel change sequence detection system using an entropy-based method, a channel diversity value for channel change sequence data collected for a unique entry-point for streaming content from a service provider system, where the channel diversity value is a measure of the diversity of the channel change sequence data, reviewing, by the automated channel change sequence detection system using machine learning, at least the channel diversity value to determine an issue, and outputting, by the automated channel change sequence detection system to a service provider system component associated with the determined issue, an issue message to act on the determined issue.

21 Claims, 12 Drawing Sheets

5000

AUTOMATED DETECTION OF CREDENTIAL THEFT AND NETWORK ERRORS USING CHANNEL CHANGE SEQUENCE ENTROPY METRICS

TECHNICAL FIELD

This disclosure relates to account fraud and network error detection. More specifically, this disclosure relates to determining entropy metrics based on channel change sequences and related data and using same to infer user characteristics and network conditions and/or behavior.

BACKGROUND

The ability to stream content on a plurality of devices and at different locations engenders potentially fraudulent use of an account or credential sharing. Detection of credential sharing, however, is not straightforward. For example, while a large number of devices or streaming locations may be suspicious for an account, the usage scenario may be due to a highly mobile customer, a large number of family members, and similar factors which collectively provide a legal basis for use of the account.

Digital Rights Management (DRM) is an integral part of modern streaming television services. DRM licensing is an indispensable component of modern content distribution networks to protect the content and to mitigate theft. In spite of the successes, quelling content abuse has been an ongoing battle. The typical exploits could range from unauthorized password sharing and stolen credentials to automated bots masquerading as humans. Automated bot activities add unnecessary load to Internet Protocol (IP) video delivery systems by consuming capacity that could have been used to serve legitimate customers.

Current fraud analytics are generally based on aggregated trends and are not sufficiently granular. Entropy-based anomaly detection methods are generally built on video watch time by the viewer. Such methods are not granular enough for accurate results. In addition, automating entropy-based methods to track tens of millions of devices are computationally expensive as well.

SUMMARY

Disclosed herein is a system and method for automated detection of credential theft and network errors using channel change sequence entropy metrics. In implementations, a method includes determining, by an automated channel change sequence detection system using an entropy-based method, a channel diversity value for channel change sequence data collected for a unique entry-point for streaming content from a service provider system, where the channel diversity value is a measure of the diversity of the channel change sequence data, reviewing, by the automated channel change sequence detection system using machine learning, at least the channel diversity value to determine an issue, and outputting, by the automated channel change sequence detection system to a service provider system component associated with the determined issue, an issue message to act on the determined issue.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
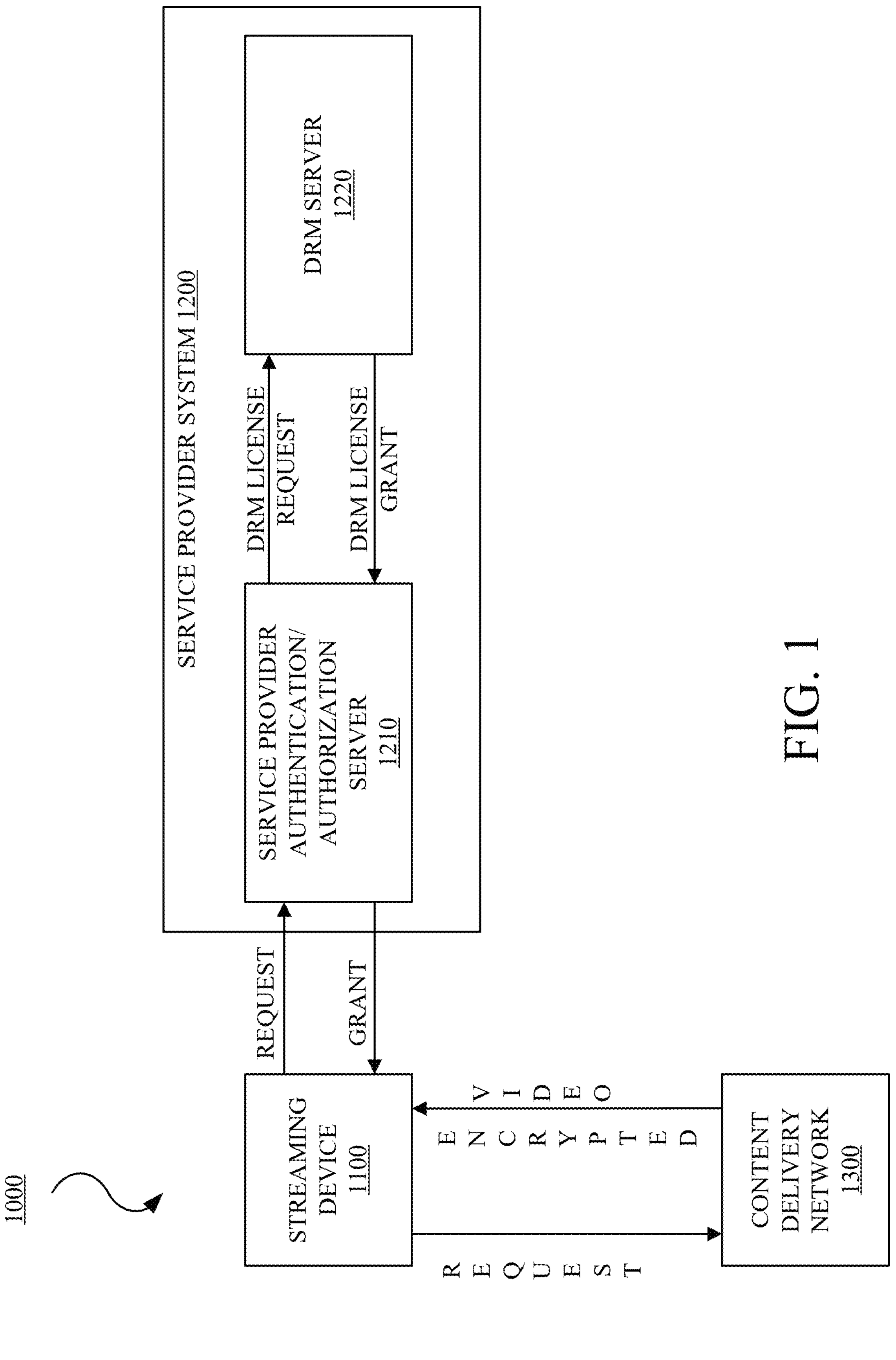
FIG. 1 is a diagram of an example of a streaming architecture with DRM flow in accordance with embodiments of this disclosure.

Reference will now be made in greater detail to embodiments, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" or "processing circuitry" indicates one or more processors, such as one or more special purpose processors, one or more digital signal processors, one or more microprocessors, one or more controllers, one or more microcontrollers, one or more application processors, one or more central processing units (CPU) s, one or more graphics processing units (GPU) s, one or more digital signal processors (DSP) s, one or more application specific integrated circuits (ASIC) s, one or more application specific standard products, one or more field programmable gate arrays, any other type or combination of integrated circuits, one or more state machines, or any combination thereof.

As used herein, the term "engine" may include software, hardware, or a combination of software and hardware. An engine may be implemented using software stored in the memory subsystem. Alternatively, an engine may be hardwired into processing circuitry. In some cases, an engine includes a combination of software stored in the memory and hardware that is hard-wired into the processing circuitry.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the term "memory" includes one or more memories, where each memory may be a computer-readable medium. A memory may encompass memory hardware units (e.g., a hard drive or a disk) that store data or instructions in software form. Alternatively or in addition, the memory may include data or instructions that are hard-wired into processing circuitry. The memory may include a single memory unit or multiple joint or disjoint memory units, which each of the multiple joint or disjoint memory units storing all or a portion of the data described as being stored in the memory.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

Further, for simplicity of explanation, although the FIGURES and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the FIGURES and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a system and method for automated detection of credential theft and network errors using channel change sequence entropy metrics. In implementations, the system and methods described herein can identify unauthorized password sharing and stolen credentials instances, identify automated bots masquerading as real users, identify network anomalies, identify component and/or process errors, ascertain the integrity of DRM process flows, provide additional data points for planning, such as predicting customer churn and advertising opportunities, and/or combinations thereof. Entropic changes can detect a broad range of systematic issues in a streaming infrastructure, such as network conditions, network errors, and/or any subsystems or components therein (collectively "network error") as well Internet Protocol (IP) and internet network errors and issues.

Entropy reflects the degree of randomness or unpredictability in the possible outcomes of an event. If more outcomes are feasible, then the associated entropy is high as well. For example, the possible outcomes for a 6-sided dice are higher than that for a H/T coin toss. Entropy has its roots in physics and statistical mechanics, where it denotes the disorder or randomness of a physical system. Claude Shannon introduced the entropy concept in his formulation of Information Theory (1948), to quantify the amount of information in a set of random outcomes. Given the probabilities P of a random distribution X, the informational entropy H is given by:

$$H(X) = -\sum_{i=1}^{n} P(x_i)\log_b P(x_i) \quad \text{Equation (1)}$$

The summation is carried out over all possible outcomes. If the outcome of an event is more likely, the entropy value H will be low. On the other hand, If the dataset is more disordered then the outcome will be hard to predict (more uncertainty). In such a scenario the calculated entropy will be high.

In implementations as described herein, entropy can be applied to users' channel change behaviors to detect credential theft and network errors. A typical user's channel change behavior (such as via a TV remote) generally follows a regular pattern. That is, average users exhibit consistency in their channel tuning behavior. Each such channel change sequence has an associated entropy value. The entropy value is a measure of the diversity of the channel change sequence. Diversity in turn enables drawing of inferences on user characteristics and network conditions. In an illustrative example, if a user mainly watches news genre channels, the entropy of the genre channel change sequence is low (e.g., NEWS (CNN), NEWS (MSNBC), NEW (FOX), NEWS (BBC), NEWS (CNN) . . . ). This is because only a few channels are involved which are randomly repeatable and CNN is the most predictable. Lower entropy is sensitive to fewer channels and even more so to any channel that is more predictable than the others e.g., CNN. In this instance, the genre sequence is NEWS, NEWS, NEWS, NEWS, NEWS, NEWS, and NEWS. The entropy value for this genre sequence is 0.0. The genre sequence entropy or diversity value can be used to characterize a unique entry-point and/or streaming device. This, in turn, can be used in the detection of fraud, theft, opportunity, and issue as described herein. In an illustrative example, collected channel change sequence data can be classified by genres, and genre entropy values (genre diversity values) can be determined as described herein to characterize a device or unique entry-point. In contrast, a bot having access to or using a compromised account can programmatically channel tune to hundreds of channels in a day. This channel change sequence will have a very high entropy.

As noted above, each channel change sequence has an associated entropy/impurity value, which is defined herein as channel diversity (CD). A measure or value of channel diversity can be computed using a variety of entropy-based methods including, but not limited to, classical Shannon formula, maximum entropy, minimum entropy, approximate entropy, spectral entropy, sample entropy, permutation entropy, multiscale entropy, multiscale-permutation entropy, fuzzy entropy, multiscale-fuzzy entropy, and dispersion entropy as described in "An Entropy-Based Approach for Anomaly Detection in Activities of Daily Living in the Presence of a Visitor," Entropy 2020, 22, 845, the contents of which are incorporated herein by reference as if set forth herein.

In modern networks with tens of millions of users and with millions of license requests per day, it is challenging to perform this evaluation in an automated fashion. In implementations, the channel diversity can be computed using a Gini impurity and/or index formula. The Gini index offers a fast validation mechanism that can be automated in a large network. Named after the Italian statistician Corrado Gini, it is a measure of purity of elements in a class in machine learning (decision trees). If all elements belong to one class ("pure" scenario) then the Gini index is '0'. It reaches the highest value of 1 when the mix is completely random. The Gini index is computed by:

$$Gini(E) = 1 - \sum_{j=1}^{c} p_j^2 \quad \text{Equation (2)}$$

The Gini index can be seen as the probability of sampling two observations of different classes in a dataset. For a homogeneous data set (no impurities), the probability will be 1 (100%). Unlike the Shannon equation, the Gini index formula and computation lacks a logarithmic aspect. This enables an automated solution to handle tens of millions of devices in a performant manner. The Gini index formula and computation enables a computationally efficient method for computing the entropy metrics.

As an illustrative example, if the user mainly watches news and sports channels, the channel change sequence could be FOX, CNN, FOX, ESPN, FOX, CNN, FOX, CNN, FOX, ESPN. The sequence has 10 events. In this sequence, FOX appears 5 times and has a probability (p-FOX) of 5/10, ESPN appears 2 times and has a probability (p-ESPN) of 2/10, and CNN appears 3 times and has a probability (p-CNN) of 3/10. Using Equation (2), the Gini index can be determined as:

$$Gini(E) = \left(1 - p - ESPN^2 - p - CNN^2 - p - FOX^2\right) \quad \text{Equation (3)}$$

$$Gini(E) = \left(1 - (2/10)^2 - (3/10)^2 - (5/10)^2\right)$$

$$Gini(E) = 0.62$$

The Gini index value can range between 0 to 1. A Gini index value closer to 0 means less variability whereas a Gini index value closer to 1 means greater variability.

It is posited that the Gini index is a measure of consistency in channel change behavior. That consistency, however, breaks down under anomalous conditions. In such a situation, many more random channels will be present in the sequence. As the channel sequence become more diverse this change is reflected as a higher Gini index. In general, abnormally high diverse channel tunes can be attributed to several factors including, but not limited to, automated bots, credential sharing, credential theft, credential fraud, outliers, and/or network errors. The outliers can include, for example, unhappy customers that are simply surfing the channels.

The channel diversity defined above is an inherent marker of viewing behavior and therefore an indication of the number of users behind a unique entry-point. The latter attribute is defined as multiplicity. Multiplicity can range from a few individuals to hundreds or thousands of virtual entities as in the case of an automated bot. Note that the multiplicity could be a qualitative or quantitative measure.

The users in this context could be real and/or virtual. Examples of an entry-point to the network can include, but are not limited to, a user account, a device Internet Protocol (IP) address, a device medium access control (MAC) address, and/or combinations thereof. Illustratively, a single user or a single device household can have a channel change sequence of A-B-C-B-A, for example. However, a sequence with contiguously repeated channels, such as A-B-B-C-A, indicates an anomaly such as more than one user or a network error. In this instance, the contiguously repeated B and B channel selections are indicative of an issue.

Figure 2:
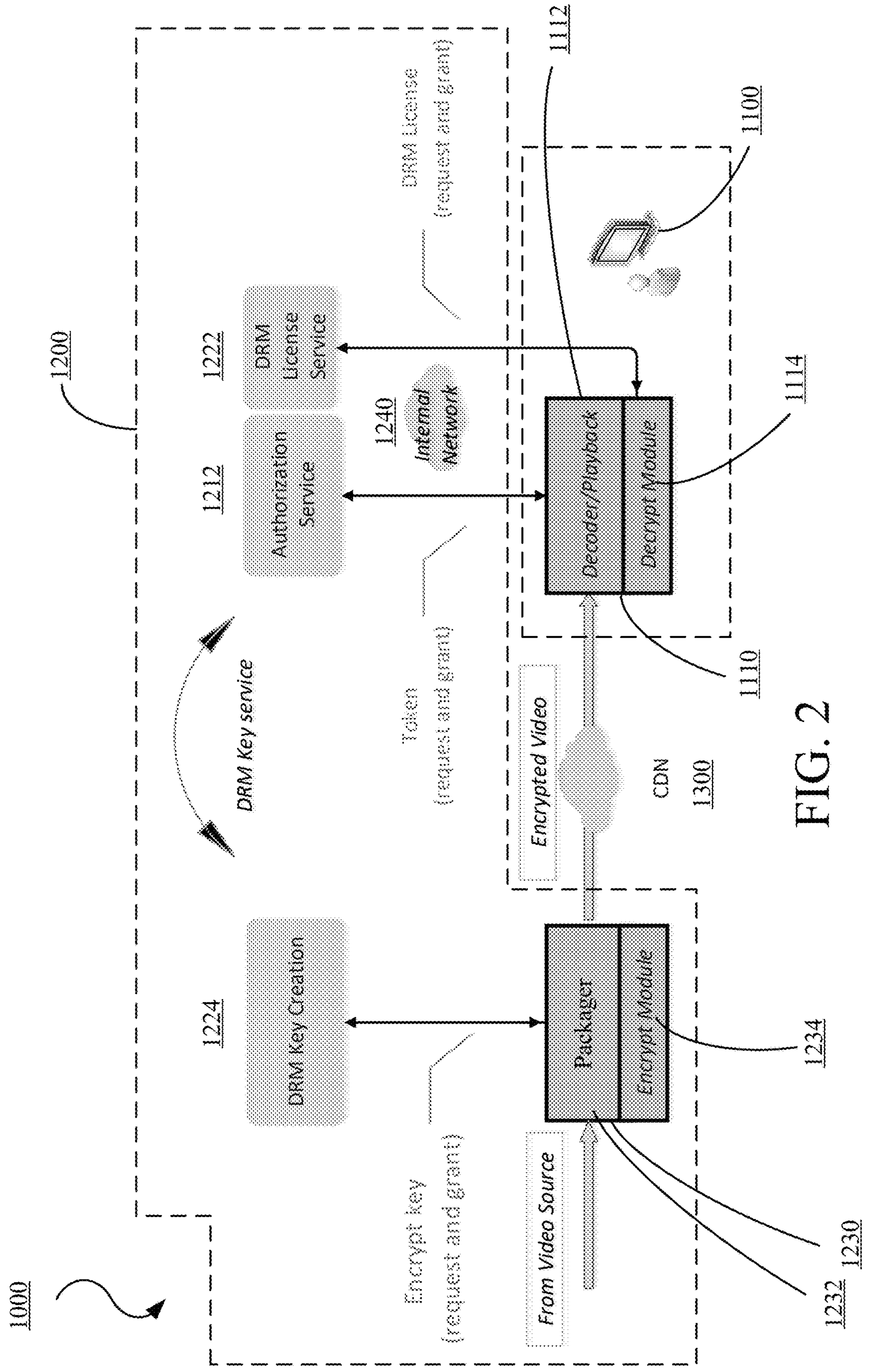
FIG. 2 is a diagram of a further example of a streaming architecture with DRM flow in accordance with embodiments of this disclosure.
Figure 3:
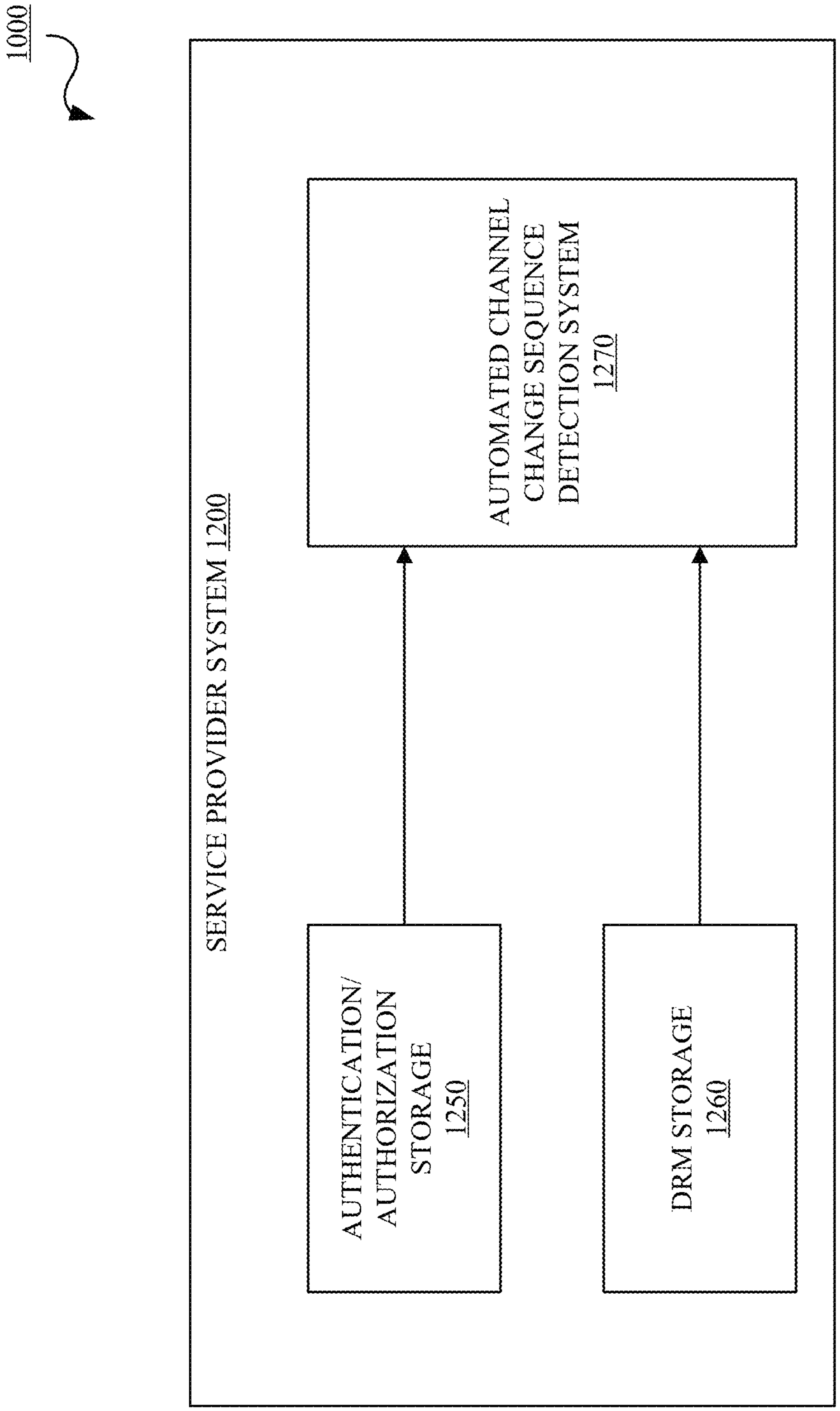
FIG. 3 is a diagram of an example of an automated channel change detection flow in accordance with embodiments of this disclosure.

A service provider system can collect data from a number of sources and transaction events as users and associated streaming devices stream content via the service provider system. Transaction events related to DRM are one such source of data. FIG. 1 is a diagram of an example of a streaming architecture 1000 with a DRM flow in accordance with embodiments of this disclosure. FIG. 2 is a diagram of a further example of a DRM flow in the streaming architecture 1000 of FIG. 1 in accordance with embodiments of this disclosure. FIG. 3 is a diagram of an example of an automated channel change detection flow 3000 in the streaming architecture 1000 of FIG. 1 and FIG. 2 in accordance with embodiments of this disclosure.

The streaming architecture 1000 can include, but is not limited to, streaming device(s) 1100 connected to or in communication with (collectively "connected to") to a service provider system 1200 and a content delivery network (CDN) 1300. The number of components shown herein are illustrative and there may be more or less in the streaming architecture 1000. The streaming architecture 1000 and the components therein may include other elements which may be desirable or necessary to implement the devices, systems, and methods described herein. However, because such elements and steps do not facilitate a better understanding of the disclosed embodiments, a discussion of such elements and steps may not be provided herein.

The streaming device(s) 1100 can include, but is not limited to, mobile device(s), smartphone(s), customer premises equipment, laptop(s), computing device(s), set-top box (es), personal computers (PCs), cellular telephones, Internet Protocol (IP) device(s), computers, desktop computer(s), handheld computer(s), personal media device(s), notebook (s), notepad(s), multiple viewing device(s) in a multi-dwelling unit, bots, and/or combinations thereof. The streaming device(s) 1100 can include applications such as, but not limited to, a mail application, a web browser application, an IP telephony application, an IP video application, and the like. The streaming device(s) 1100 can access content from the service provider system 1200 and the CDN 1300 by using a unique account entry-point, such as, but not limited to, a user account and password, a device Internet Protocol (IP) address, and/or a device medium access control (MAC) address. The streaming device(s) 1100 further is associated with a decoder system 1110. The decoder system 1110 can include, but is not limited to, a decoder 1112 and a decryption module 1114.

The service provider system 1200 can include, but is not limited to, a service provider authentication and authorization server 1210, a DRM server 1220, an encoder/packager system 1230, and an internal network 1240 for communicating between components in the service provider system 1200. The encoder/packager system 1230 can include, but is not limited to, an encoder/packager 1232 and an encryption module 1234. In implementations, the encoder system 1230 can be part of the CDN network 1300. The number of components shown herein are illustrative and there may be more or less in the service provider system 1100. The service provider system 1100 and the components therein may include other elements which may be desirable or necessary to implement the devices, systems, and methods described herein. However, because such elements and steps do not facilitate a better understanding of the disclosed embodiments, a discussion of such elements and steps may not be provided herein.

The service provider authentication and authorization server 1210 can authenticate and authorize the streaming device(s) 1100 with respect to a content streaming request via an authorization service 1212. The service provider authentication and authorization server 1210 can interact with the DRM server 1220 in response to an authenticated and authorized streaming device(s) 1100.

The DRM server 1220 can generate a DRM license in response to receiving a DRM request from the streaming device 1100 via a DRM licensing service 1222 and a DRM key creation service 1224.

Operationally, a user(s) using the steaming device 1100 can send a request (e.g., a change channel request) to a service provider system 1200 to playback or steam content. The user and/or streaming device 1100 is associated with a unique entry-point identifier, such as, but not limited to, a user account and password, a device IP address, and/or a device MAC address. In implementations, the request can include a request for a service provider token. The token request is validated by the service provider authentication and authorization server 1210. The service provider authentication and authorization server 1210 can, via the authorization service 1212, grant a token after successfully authenticating and authorizing the user and/or the streaming device 1100. Each token has a relatively short duration. The streaming device 1100 with the token can send a DRM license request to the DRM server 1220 and/or the DRM licensing service 1222 to request the DRM key to decrypt the content. The DRM key creation service 1224 can send an encryption key to the encryption module 1234 of the encoder/packager 1232 to encrypt the content received from a video source. The DRM licensing service 1222 can send a license with the decryption key grant to the decryption module 1114 within the user device. The user(s) using the steaming device 1100 can send a request to the CDN 1300 for the encrypted content. The decoder 1112 can decode the encrypted content received via the CDN 1300. The decrypted content can be played at or on the streaming device 1100.

To properly secure IP video content, each content has its own encryption. This means that as the user changes a channel from one channel to another channel, a new DRM license is needed. In addition, DRM licenses have an expiration time. Therefore, a request for a new license would also be needed to continue the video playback. Moreover, the duration of the service provider token is relatively short in comparison with the content. The number of token requests should therefore be a close equivalent to the number of DRM license requests.

The data generated from a content request and/or a channel change can include, but is not limited to, data from the service provider authentication and authorization server 1210, data from the DRM server 1220, other service provider systems, and/or combinations thereof.

The data from the service provider authentication and authorization server 1210 can be stored in an authentication and authorization storage 1250. The service provider authentication and authorization server 1210 data can include, but is not limited to, service provider token count, account entry-point identifier data and/or information, IP addresses, Splunk logs, and/or combinations thereof. The data from the DRM server 1222 can be stored in a DRM storage 1260. The data can include DRM license requests, DRM license grants, DRM license request count, DRM license grant count, channel change data and/or information (i.e., channel tune data), account entry-point identifier data and/or information, IP addresses, device identifier, and/or combinations thereof.

An automated channel change sequence detection system 1270 can generate entropy metrics using the data stored in the authentication and authorization storage 1250 and the DRM storage 1260. As content distributors continue to seek efficient ways to identify potential system abuse and fraud in IP video, logged data (e.g., the data stored in the authentication and authorization storage 1250 and the DRM storage 1260) from IP video delivery systems is essential to creating metrics, defining the norms, and identifying trends that are outside of the norm. The automated channel change sequence detection system 1270 can use machine learning techniques to recognize patterns from, but not limited to, the logged data, Gini index values, entropy metrics, channel count, and/or combinations thereof with respect to stolen credentials, sharing credentials, bots, multi-dwelling units, advertising opportunities, user behavior, network issues and/or errors as described herein. For example, the automated channel change sequence detection system 1270 can identify bots and non-human abuse in DRM license requests.

One of the known issues is when a miscreant obtains content from service providers illicitly and re-distributes it to unauthorized users. A telltale sign of such automated bot activity is when a large number of DRM license requests are received which exceed the normal usage levels. The logged data provides information to compute entropy metrics such as Gini index values as described herein to detect such fraudulent usage.

Average users that exhibit normal usage would have reasonable number of DRM license requests per day containing the channels/content IDs of interest to view with a limited variability (diversity). The same is true with DRM license requests from a reasonable number of originating IP addresses/locations. Bots and non-human behavior would lead to higher number of DRM licenses requests per day, greater variety of content requests/content IDs, a wider range and a larger number of unique originating IP addresses which may indicate bot and non-human requests. Entropy metrics and/or Gini index values determined from the logged data can detect this type of usage.

As described herein, the service provide system 1000 can collect DRM transaction data and viewership data from tens of millions of customer devices. Over time such data exhibits certain patterns due to the differences in individual viewing behaviors. The resulting probability distributions can be analyzed with the Gini index formula and using machine learning techniques. The automated channel change sequence detection system 1270 can determine Gini index values for a variety of data.

As described herein, DRM governs the legal access to digital content. When a user device (e.g., streaming device 1100) tunes to a channel, the user device obtains the decrypt key through the DRM license from a DRM server such as DRM server 1220. The data generated from the sequence of DRM license requests and grants can be used to generate DRM Gini index values. The DRM Gini index values can include, but are not limited to, DRM token Gini index values, DRM license request Gini index values, DRM license grant Gini index values, and/or combinations thereof. If the DRM process is compromised, then the DRM Gini index values for license requests and grants would differ. This variance can be used (e.g., in a rules engine as described herein) to ensure the integrity of the DRM process.

The automated channel change sequence detection system 1270 can also determine a channel change sequence Gini index value. Each sequence of channel changes has an associated entropy which is reflected in a Gini index value.

The automated channel change sequence detection system 1270 can also determine a channel view time or watch time Gini index value. In implementations, determinations from the automated channel change sequence detection system 1270 can be validated, in part, by entropy metrics not based on DRM transactions such as, the watch time Gini index value.

Given the DRM token Gini index values, the DRM license request Gini index values, and the DRM license grant Gini index values, determinations can be made as to credential sharing, fraud, network errors, and other issues.

In implementations, network errors can be identified when the DRM token Gini index values as compared to the DRM license request Gini index values, and/or DRM license grant Gini index values are unequal.

Error conditions: Gini-DRM-token≠Gini-DRM-license-request

Gini-DRM-token≠Gini-DRM-license-grant

These inequalities can be mainly due to network errors, including but not limited to, incorrect logging mechanisms or server misconfigurations. Other indicators of network errors can include the determination of a large number of channel changes in millisecond or sub millisecond durations. These durations are quite different from human behavior. The determined network errors can be cross validated by comparing data from other network sources.

As described, the automated channel change sequence detection system 1270 proactively and efficiently identifies anomalies in video delivery components and/or systems through the data obtained from the video stream license requests and channel change patterns. The ability to identify anomalies before customers call in to report potential issues results in economic efficiency and gain.

In implementations, the automated channel change sequence detection system 1270 can determine issues related to backend services in the service provider system 1000. For example, when authentication systems take longer than the average and/or expected time to respond to customer authentication requests (i.e., increased latency), this can be an indication that the backend services may not be scaled properly to address traffic in the service provider system. If these issues go unchecked, the customer experience is impacted. The logged data can be used by the automated channel change sequence detection system 1270 to determine these issues by calculating processing times with respect to token requests and grants and DRM license requests and DRM license grants.

In implementations, the automated channel change sequence detection system 1270 can determine issues related to aging devices that need attention. As new devices are deployed, aging devices are not churned out of the systems/network due to customer reluctance in upgrading an aging device and/or unwilling to learn to use a newer device that the carrier has to continue to support. In some cases, the device behavior/performance does not line up with the newer devices even within the same brand. For example, pre-2016 Samsung televisions showed devices that were stuck in the IP video streaming application, which caused the devices to rapidly make DRM license requests every 2 seconds for X minutes. The same application on newer versions of the Samsung televisions do not get stuck in this state. The logged data can be used by the automated channel change sequence detection system 1270 to determine these issues by determining the number or count of DRM license requests and DRM license grants in a defined interval. The automated channel change sequence detection system 1270 can detect device behaviors that are outside of the norm.

In implementations, the automated channel change sequence detection system 1270 can determine issues related to multiplicity. As stated herein, multiplicity is defined as the number of users (humans, bot, and/or automated), behind a single entry-point of the network (e.g., an account identifier, device IP address, and/or device MAC address).

Figure 4:
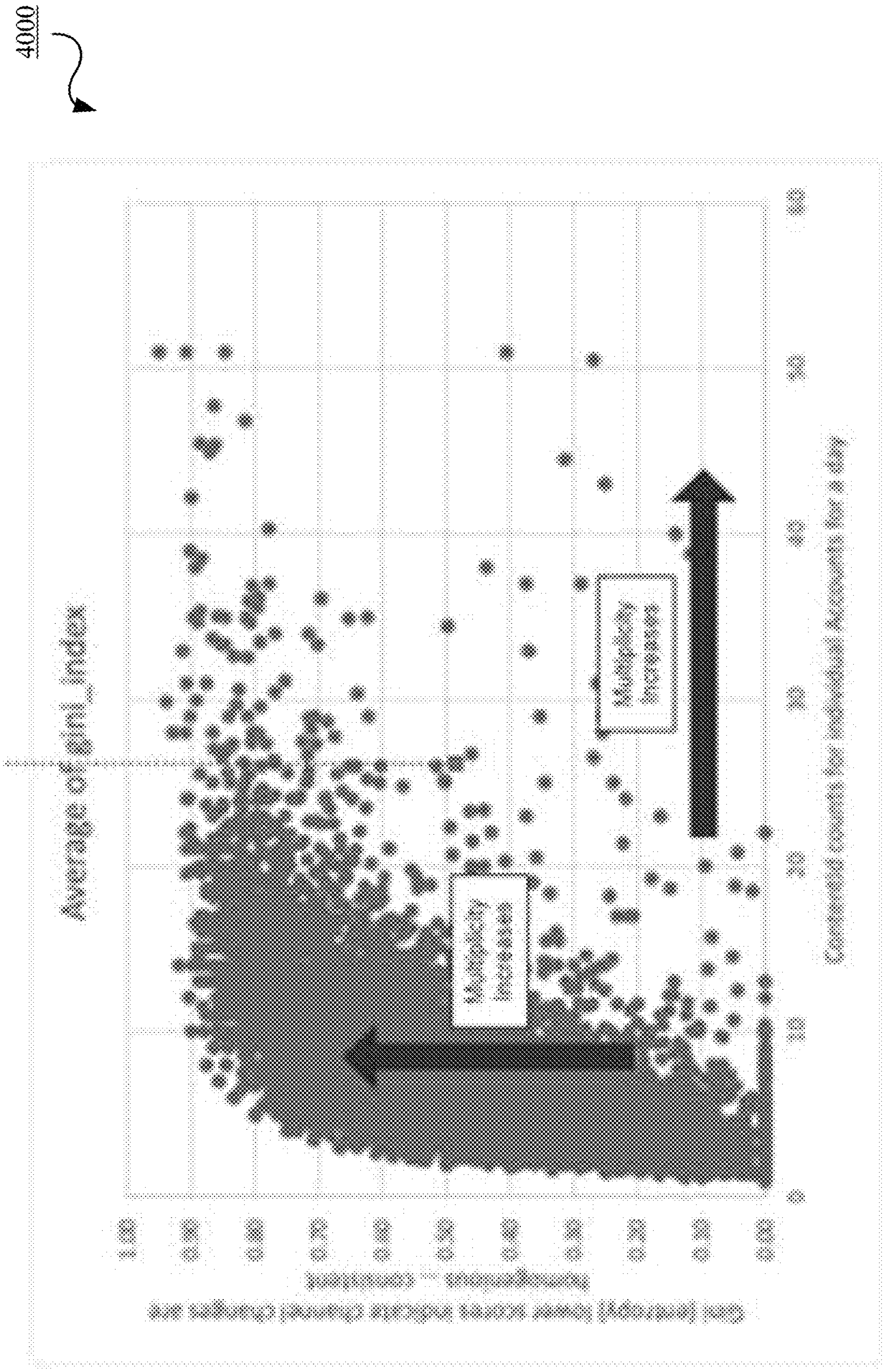
FIG. 4 is a plot of multiplicity in accordance with embodiments of this disclosure.

FIG. 4 is a plot 4000 of the channel diversity versus the channel counts, change channel counts, or contentID counts (collectively "channel change counts"). The channel diversity is derived from the Gini formula and the channel change counts are the measured and/or counted channel changes during a defined observation period. In implementations, the defined observation period can be configurable. Each dot signifies an entry-point IP address, which could be a single person, a household, a multi-dwelling unit (MDU), or an automated bot. Multiplicity is the predicted likelihood of multiple users behind a single entry-point to the network or service provider system. The multiplicity increases as the graph is traversed rightward along the horizontal axis (more channel counts). The same behavior is observed in the northward direction as well (high channel diversity).

Figure 5:
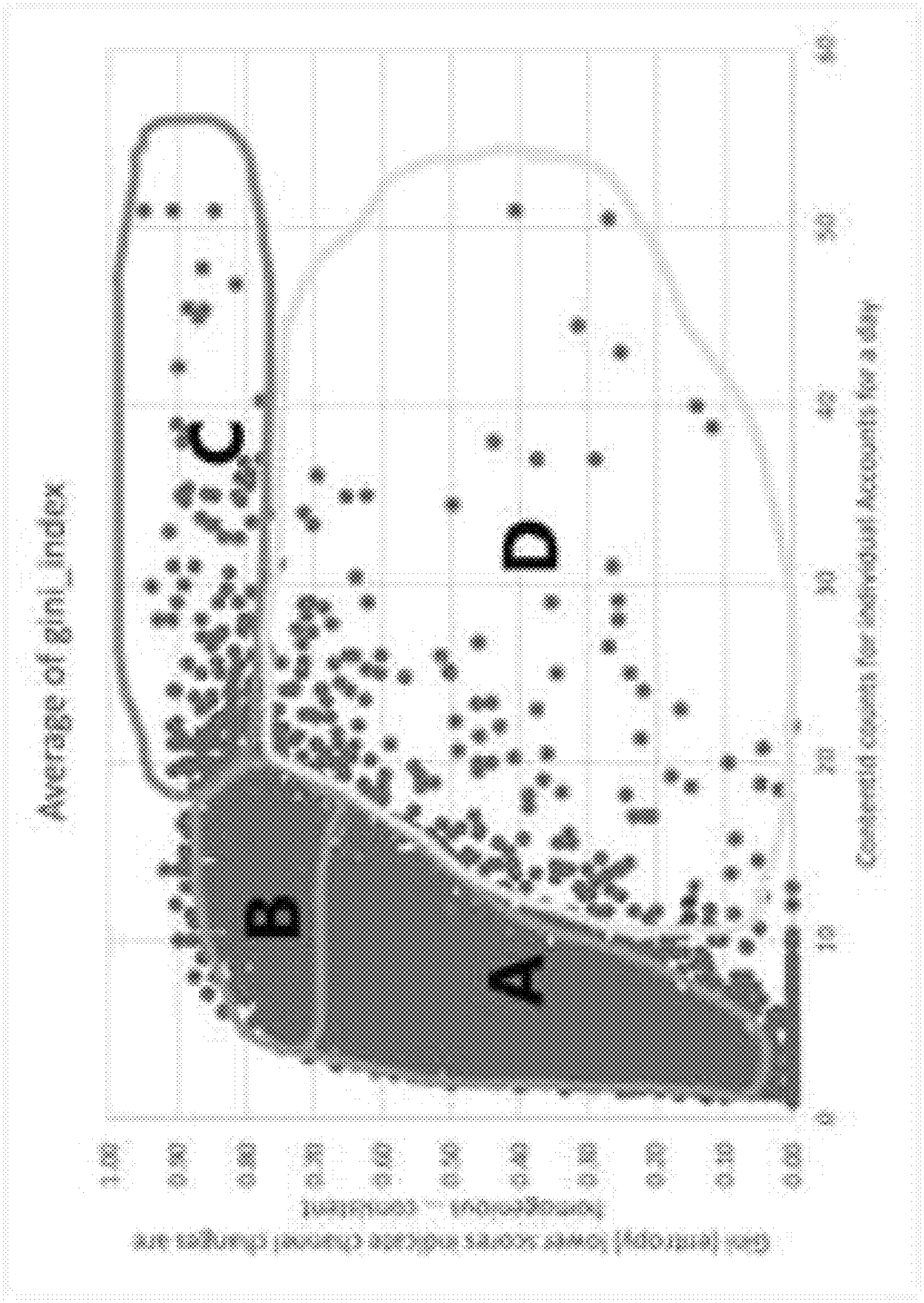
FIG. 5 is an annotated version of the plot of FIG. 4 in accordance with embodiments of this disclosure.

FIG. 5 is an annotated version of the plot 4000 shown in FIG. 4. In FIG. 5, the plot 4000 can be divided into multiple regions as shown in annotated plot 5000. In this instance, the annotated plot 5000 can include four regions, A, B, C, and D. Region A shows normal behavior. Low channel diversity values denote a single user or a household. High channel diversity values indicate multiple users sharing the credentials (e.g., content/device ID or IP). In the latter instance, this could be due to multiple family members in the household. Region B also shows normal behavior, but with a high propensity for shared passwords instances. Region C shows a high number of users such as large MDUs. The region C might also show instances of channel zapping (e.g., rapid channel surfing), or bots. Region D shows bots (i.e., low entropy with repeated Content_ID). Region D can also show smaller MDUs. In the above snapshot view, bots and MDUs (e.g., 50-100 users in one account), can exhibit similar behavior. To distinguish between the two determinations, the automated channel change sequence detection system 1270 can perform residual analysis.

Figure 6:
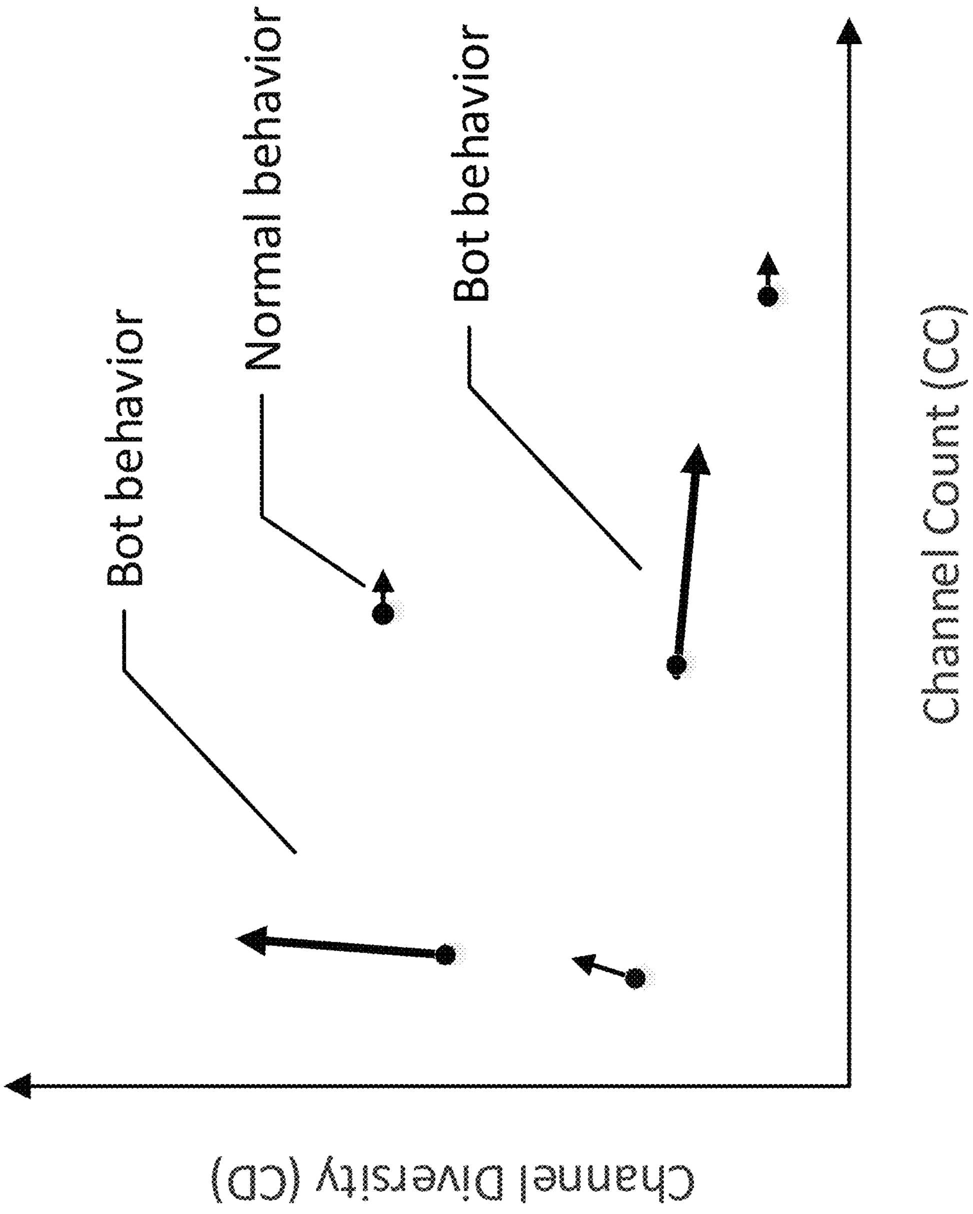
FIG. 6 is a plot showing residual analysis in accordance with embodiments of this disclosure.

FIG. 6 is a plot showing residual analysis in accordance with embodiments of this disclosure. The automated channel change sequence detection system 1270 can compare two consecutive plots computed at two similar points in the timeline, (e.g., daily at 7:00 PM or two consecutive Sundays). The assumption is that under steady-state conditions, the dots should return close to their original positions at consecutive times. By subtracting the coordinates of datapoints from consecutive plots a residual plot can be obtained. In an illustrative example, since MDUs are expected to be in steady state, there should not be much movement. In contrast, bots would be active with frequent movement. This will be reflected in the residual plot as long vectors. In other words, an entry-point IP address and/or associated device with normal behavior vectors have day-to-day changes in most directions that are smaller in contrast to bot behavior vector changes which are longer in length. In the illustrative plot, the vector is defined by Channel Count (CC) in the abscissa (x) direction and Channel Diversity (CD) in the ordinate (y) direction.

Referring now to FIG. 6, the location, length, and direction of the residual vectors indicate the type of issue/bot and its impact. For instance, a more vertically inclined vector could be an indication of stolen credentials for a major sports event. That is, there is no increase in channel count (indication of being on one channel) and there is an indication of multiplicity. In another instance, a horizontally inclined vector might be indication of someone selling/sharing credentials indiscriminately at scale. That is, there is an increase in channel count (indication of multiple channels being viewed using same entry-point) and there is an indication of multiplicity. The above vector analysis can provide further insight in time-series evolution. The affinity of two vectors can be compared with their cosine similarity and scalar product measures. By studying the long behavior of the above vectors, different types of bots (and other miscreants) can be identified based on their similarity characteristics.

Figure 7B:
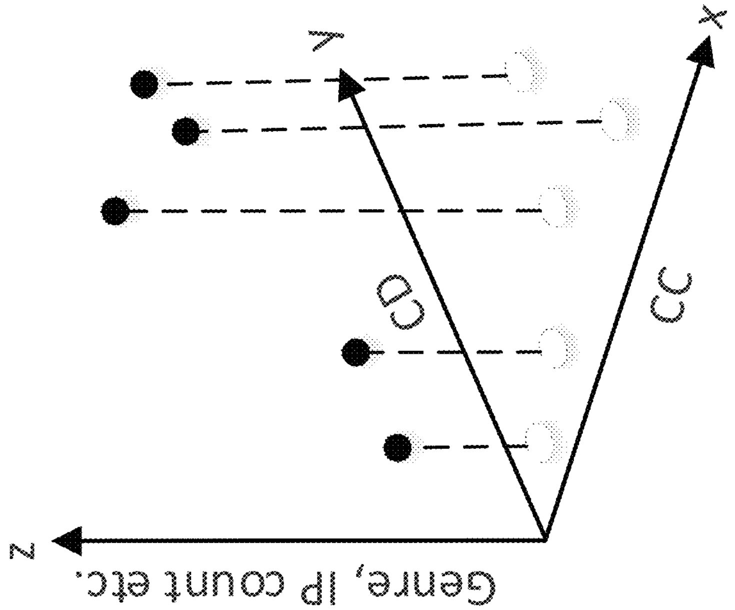
FIGS. 7A and 7B are plots showing layered analysis in accordance with embodiments of this disclosure.
Figure 7A:
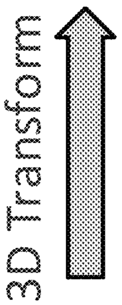
Figure 7A:
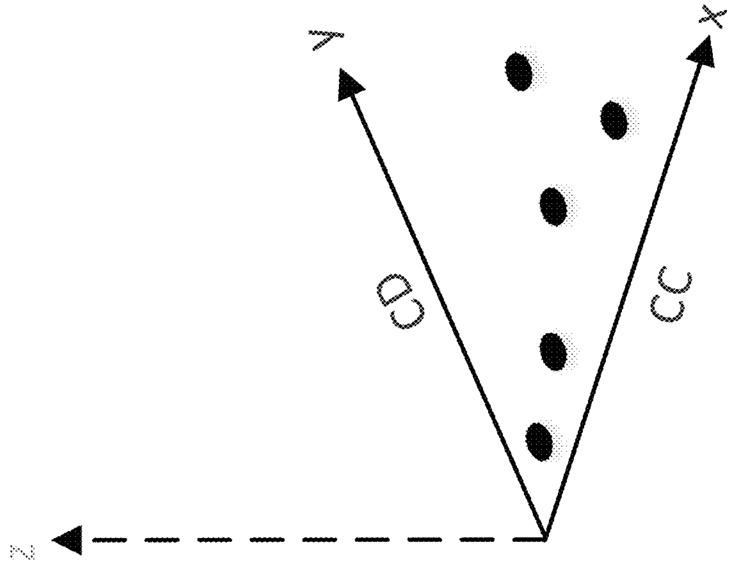

FIGS. 7A and 7B are plots showing layered analysis in accordance with embodiments of this disclosure. In addition to channel count (x-axis) and channel diversity (y-axis) as shown in FIG. 7A, a $3^{rd}$ dimension is added and shown in FIG. 7B to gain further insights on behavioral or network patterns, e.g., opportunity analysis using machine learning. In an illustrative example, content of each channel viewed belongs to a television genre. There are over a dozen such categories (e.g., news, sports, talk shows, game shows, sitcoms, reality, dramas, soap operas, cartoons, etc.). A 3D plot with genre as the z-axis would indicate the prevalence of dots by genre. This data would be useful for identifying advertising opportunities, for instance. In another illustrative example, the z-axis could show how long a user stayed as a customer (or any other demographic feature, such as income, age, etc.). A machine learning classification study can be performed with historical data to understand the relation among the variables (e.g., which demographic is more correlated with channel-zapping.) In yet another illustrative example, plotting the IP address (or ASN) data on the z-axis enables visualization of relationships useful in troubleshooting (e.g., which origination points are more susceptible to network errors).

Figure 8:
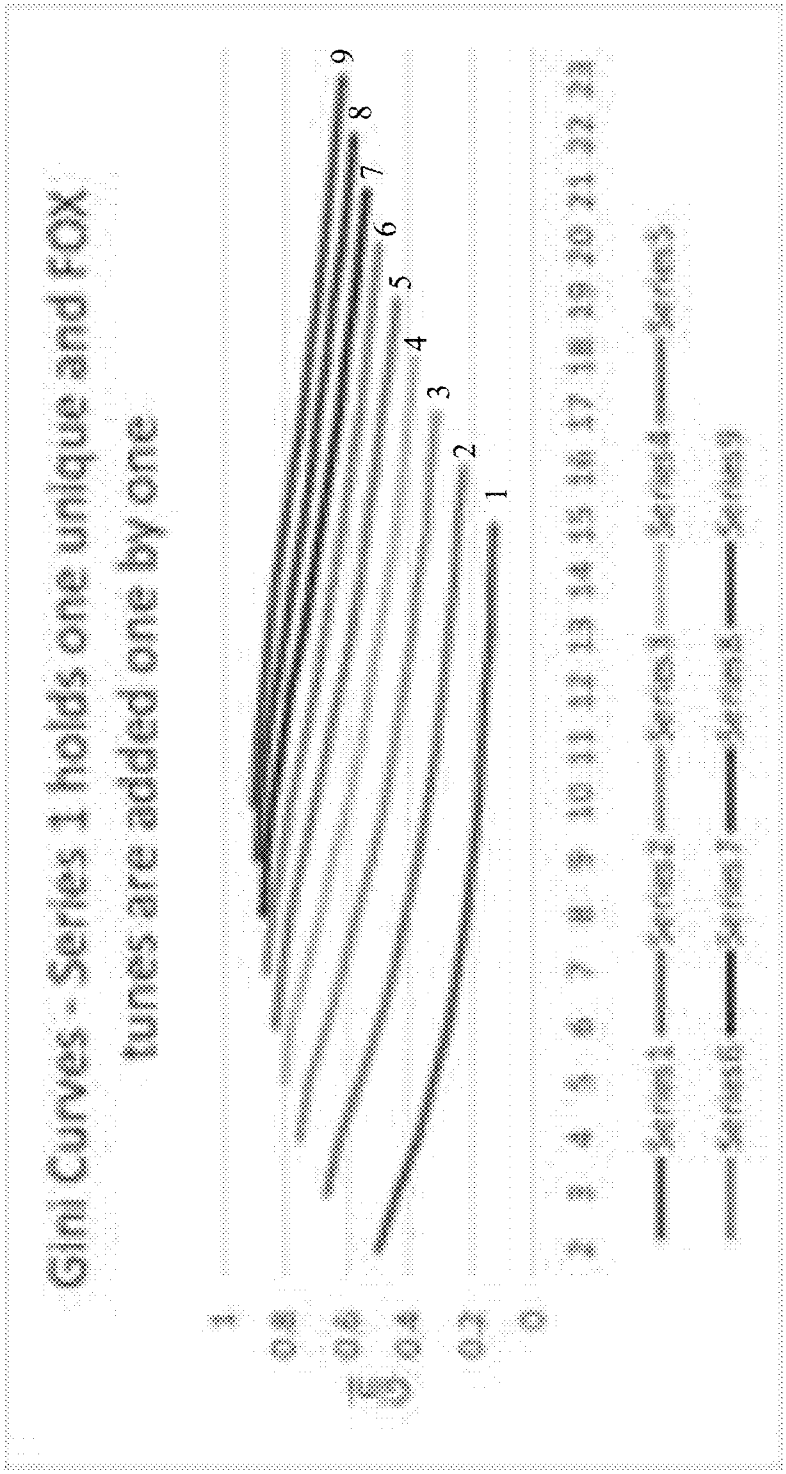
FIG. 8 is a plot showing likelihood of customer being on a certain channel in accordance with embodiments of this disclosure.

FIG. 8 is a plot showing likelihood of customer being on a certain channel in accordance with embodiments of this disclosure. As the automated channel change sequence detection system 1270 generates Gini index values from the logged data, the automated channel change sequence detection system 1270 can compute the channel change probability counts for each channel. The channels with high probabilities can be identified as the most viewed. Conversely, the channels with low probabilities are the least viewed. This data can be used to identify targeted advertisement opportunities.

As a channel change sequence extends out along each sequence curve, the automated channel change sequence detection system 1270 can track the likelihood of a customer being on a specific channel and watching a targeted advertisement. The probabilities of the customer staying on a channel and being of more value to advertisement sales are calculated. A marketing campaign can use this data analysis to target these type of customers and their sequences. The probabilities indicate the odds a customer is a specific channel at any given time and the higher odds indicate the customer is more likely to be watching the channel and the advertisement.

Figure 9:
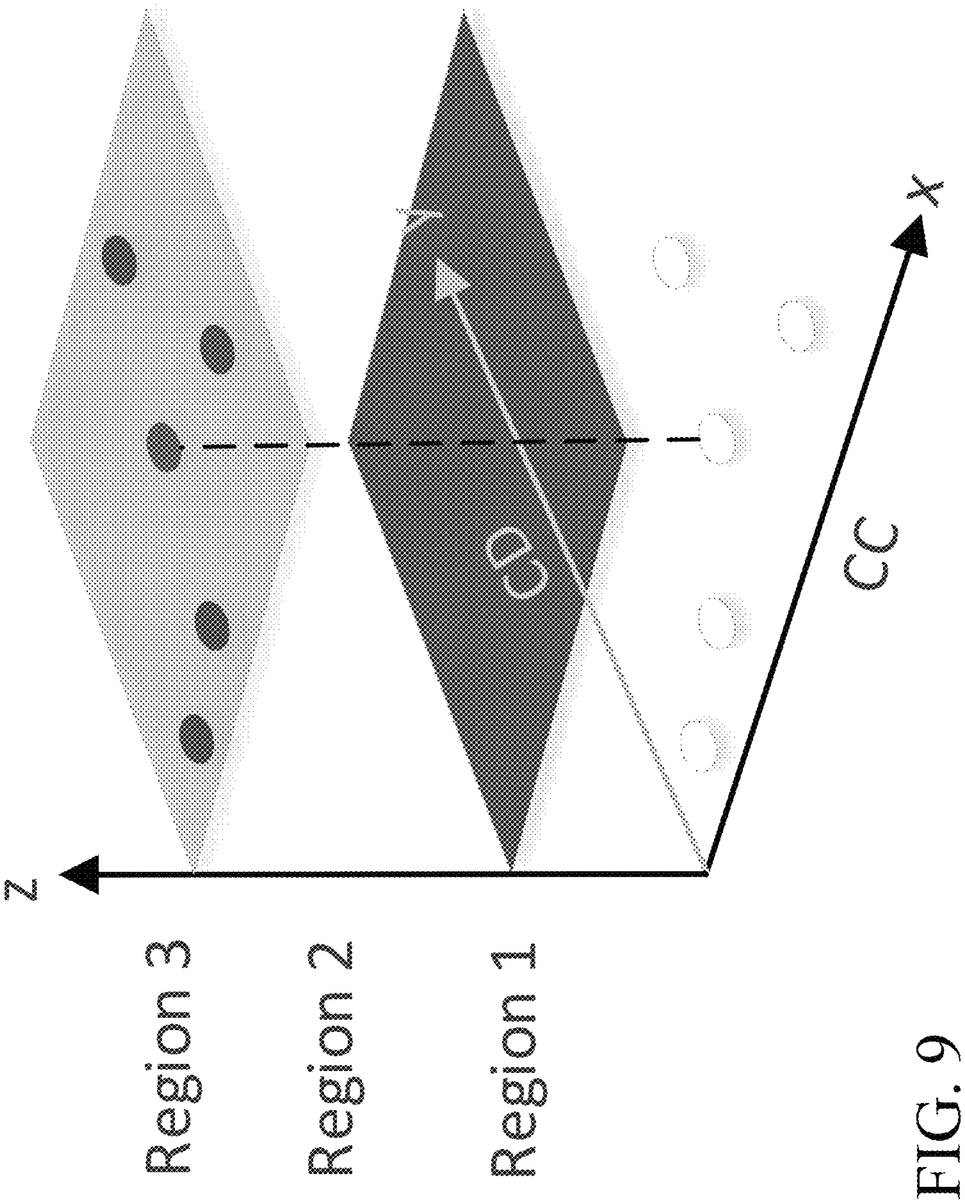
FIG. 9 is a plot showing layered analysis with network errors in accordance with embodiments of this disclosure.

FIG. 9 is a plot showing layered analysis with network errors in accordance with embodiments of this disclosure. As mentioned herein, anomalous data points in the snapshot view could be due to bots or network errors. 3D plots (e.g., FIG. 7B) can be used to identify each source (e.g., bots or network errors) separately. In this instance, demographic data (e.g., designated market area (DMA) or a collection of zip codes) can be used to form the z-axis. It is assumed that network errors would be regional or multi-regional, whereas the bot impact would be distributed indiscriminately. As shown in FIG. 9, the points due to network errors will be confined to different layers.

Figure 10:
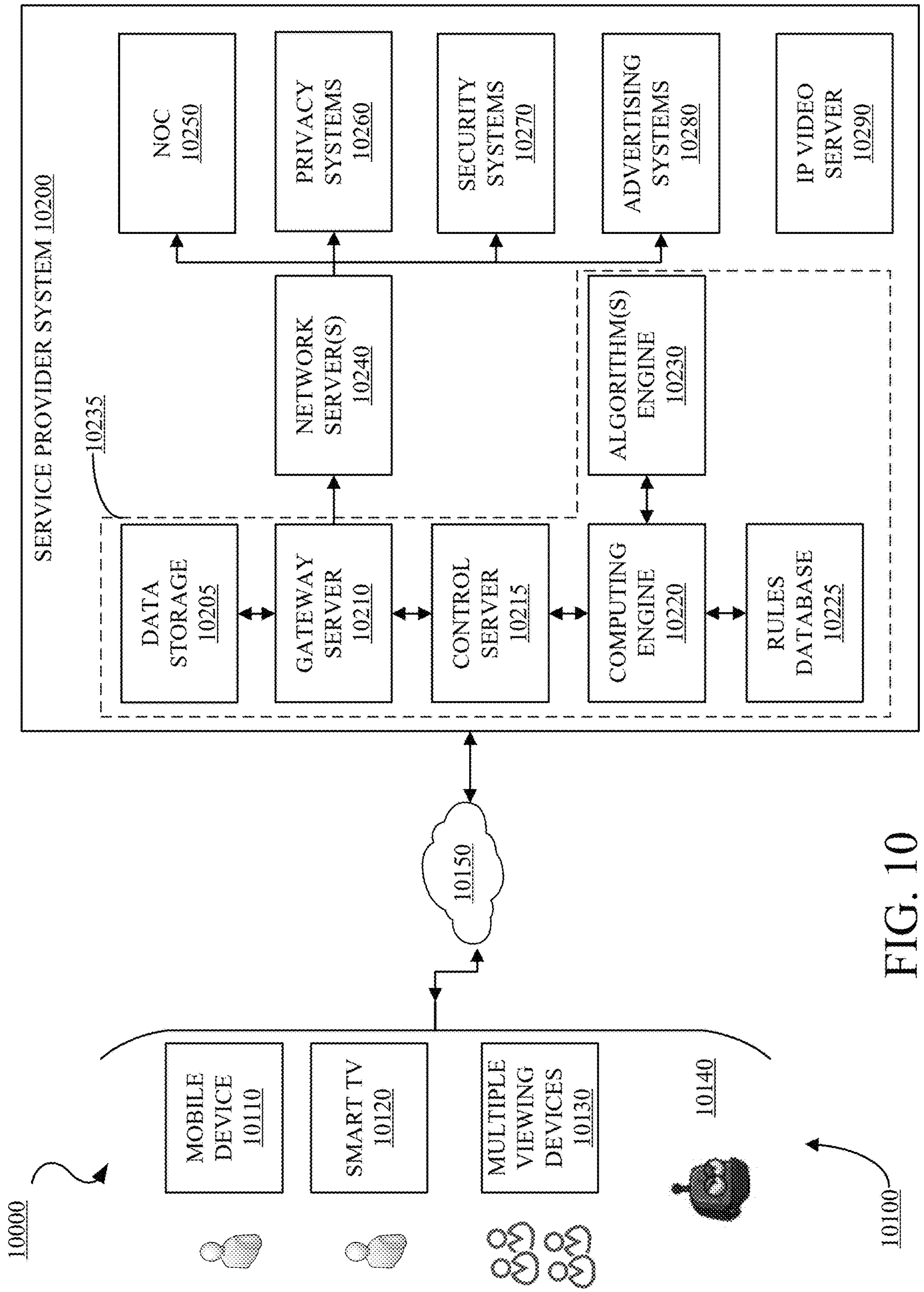
FIG. 10 is a diagram of an example of a streaming architecture with an automated channel change detection flow in accordance with embodiments of this disclosure.

FIG. 10 is a diagram of an example of a streaming architecture 10000 with an automated channel change detection flow in accordance with embodiments of this disclosure. The streaming architecture 10000 can include, but is not limited to, user streaming device(s) 10100 connected to or in communication with (collectively "connected to") a service provider system 10200 via a network 10150. In implementations, the streaming architecture 10000 and the components therein can implement the systems and methods described herein with respect to FIGS. 1-9 and 11 in addition to functionality and operability as described herein. In implementations, the streaming architecture 10000 and the components therein are interoperable with the systems and methods described herein with respect to FIGS. 1-9 and 11. The number of components shown herein are illustrative and there may be more or less in the streaming architecture 10000. The streaming architecture 10000 and the components therein may include other elements which may be desirable or necessary to implement the devices, systems, and methods described herein. However, because such elements and steps do not facilitate a better understanding of the disclosed embodiments, a discussion of such elements and steps may not be provided herein.

The user streaming device(s) 10100 can include, but is not limited to, mobile device(s) 10110, smartphone(s) 10120, customer premises equipment, laptop(s), computing device (s), set-top box(es), personal computers (PCs), cellular telephones, Internet Protocol (IP) device(s), computers, desktop computer(s), handheld computer(s), personal media device (s), notebook(s), notepad(s), multiple viewing device(s) 10130 in a multi-dwelling unit, bots 10140, and/or combinations thereof. Each of the user streaming device(s) 10100 may include applications such as, but not limited to, a mail application, a web browser application, an IP telephony application, an IP video application, and the like. The user streaming device(s) 10100 can stream content from the service provider system 10200 using an account entry-point, which can be, but is not limited to, a user account and password, a device Internet Protocol (IP) address, and/or a device medium access control (MAC) address.

The service provider system 10200 can include, but is not limited to, data storage 10205, a gateway server 10210, a control server or engine 10215, a computing engine 10220, a rules database 10225, an algorithms engine 10230, network server(s) 10240, network operations center 10250, privacy systems 10260, security systems 10270, advertising systems 10280, and an IP video server 10290. The data storage 10205, the gateway server 10210, the control server or engine 10215, the computing engine 10220, the rules database 10225, and the algorithms engine 10230 can comprise an automated channel change sequence detection system 10235. In implementations, the automated channel change sequence detection system 10235 can include and/or be the automated channel change sequence detection system 1270. The number of components shown herein are illustrative and there may be more or less in the service provider system 10200. The service provider system 10200 and the components therein may include other elements which may be desirable or necessary to implement the devices, systems, and methods described herein. However, because such elements and steps do not facilitate a better understanding of the disclosed embodiments, a discussion of such elements and steps may not be provided herein.

The data storage 10205 can store data collected from the user streaming device(s) 10100 and/or the service provider system 10200 as users stream video using the IP video application and the IP video server 10290, for example. The data can include, but is not limited to, DRM license requests data, DRM license grants data, token data, channel change data, channel viewership data, channel watch data, network data (e.g., logs from servers, routers, and other components, end-user devices, etc.), demographic data (e.g., end-user and account data including viewing history), and/or combinations thereof.

The gateway server 10210 can operate or perform as an entry and exit point for the automated channel change sequence detection system 10235 with the rest of the service provider system 10200. The gateway server 10210 can interface with an input side or components (e.g., the data storage 10205) and an output side or components (e.g., the network servers 10240) to transfer data to and from via the control server 10215.

The control server or engine 10215 can operate or perform as an orchestration layer and can coordinate the automated functioning of the other components in the automated channel change sequence detection system 10235. The control server or engine 10215 can instruct the computing engine 10220 to perform calculations and determinations as described herein. In implementations, the control server or engine 10215 can operate or perform the methods described herein and/or the automated channel change sequence detection system 10235 via batch and stream processing as defined by the rules database 10225, for example.

The computing engine 10220 can perform, as instructed by the control server 10215, the calculations and determinations as described herein (e.g., Gini index calculations, channel diversity determinations, multiplicity determinations, etc.) based on settings in the rules database 10225 and the formula and settings in the algorithms engine 10230.

The rules database 10225 can contain preset rules, which can be executed when a certain condition(s) is met. In an illustrative example, a preset rule can be users experiencing an excessive channel entropy "day to day" change exceeding a pre-defined threshold. In an illustrative example, a preset rule can be users experiencing an excessive channel entropy "day to week ago day" change exceeding a pre-defined threshold. In an illustrative example, a preset rule can be users experiencing an excessive channel entropy "minute to minute" change (near real-time) exceeding a pre-defined threshold. In an illustrative example, a preset rule can be an aggregated channel change event rate of all users on a regional IP network which drops to 0 channel changes per second to suggest a network outage. In implementations, the preset rules can be in an if-then statement format. In implementations, the rules database can specify intervals at which to the computing engine 10220 performs the calculations and determinations. In implementations, the intervals are configurable, use-case specific, default, periodic, and/or combinations thereof.

The algorithms engine 10230 can contain the Gini index formula, the Shannon entropy formula, and/or other versions as described herein in executable form.

The network server(s) 10240 can interface the automated channel change sequence detection system 10235 and/or the gateway server 10210 with other components in the service provider system 10200.

The network operations center 10250 can receive messages containing network error data and/or information detected by and from the automated channel change sequence detection system 10235 via the network server(s) 10240. The network operations center 10250 can perform corrective actions in response to the network error data and/or information.

The privacy systems 10260 can receive messages containing password sharing data and/or information, account fraud data and/or information, and/or combinations thereof detected by and from the automated channel change sequence detection system 10235 via the network server(s) 10240. The privacy systems 10260 can perform corrective actions in response to the password sharing data and/or information, account fraud data and/or information, and/or combinations thereof.

The security systems 10270 can receive messages containing automated bot data and/or information detected by and from the automated channel change sequence detection system 10235 via the network server(s) 10240. The security systems 10270 can perform corrective actions in response to the automated bot data and/or information.

The advertising systems 10280 receive messages containing advertising opportunity data and/or information determined by and from the automated channel change sequence detection system 10235 via the network server(s) 10240. The advertising systems 10280 can insert targeted advertising in response to the advertising opportunity data and/or information.

Operationally, the service provider system 10200 and/or the automated channel change sequence detection system 10235 can collect and store the data from the user streaming device(s) 10100 which are streaming content, such as video content. The data from the user streaming device(s) 10100 can be collected via the cloud using a variety of data collection modes, including but not limited to, import/export, real-time, off-line, and/or combinations thereof. The data collected can include, but is not limited to, DRM license request data, DRM license grant data, service provider token data, channel change data, channel view or watch data, and/or combinations thereof. The data can be stored in data storage 10205.

The gateway server 10210 can read the data from the data storage 10205, which can be provided to the computing engine 10220 under control of the control server 10215, which can perform or act as an orchestration layer for managing the interactions between the components in the automated channel change sequence detection system 10235 and automating the tasks performed by the automated channel change sequence detection system 10235. Under direction of the control server 10215, the computing engine 10220 in cooperation with the algorithm engine 10230 and the rules database 10225, can perform the entropy, Gini index, and/or other stochastic calculations. The output of the computing engine 10220 and/or the automated channel change sequence detection system 10235 can be provided by the gateway server 10210 and the network servers 10240 to the appropriate systems to apply corrective measures in view of the computed entropy metrics and determinations. In implementations, network errors or issues determined by the automated channel change sequence detection system 10235 can be sent to the NOC 10250, which in turn can provide additional resources, repair faulty devices, and/or make other network corrections. In implementations, password sharing data determined by the automated channel change sequence detection system 10235 can be sent to the privacy systems 10260, which in turn can deploy additional measures on the account, notify the user, suspend the account and/or take other measures to counter the illegal use. In implementations, automated bot data determined by the automated channel change sequence detection system 10235 can be sent to the security systems 10270, which in turn can deploy measures to nullify bot actions. In implementations, advertising opportunity data determined by the automated channel change sequence detection system 10235 can be sent to the advertising systems 10280, which in turn can insert targeted advertisements into identified user streams. In implementations, the corrective measures can be applied automatically by the appropriate and/or applicable systems as described herein.

In implementations, the automated channel change sequence detection system 10235 determine channel change entropy calculations for a hierarchy of streaming device objects. The most atomic of streaming devices is a single piece of hardware, for example, the DEVICE (ID). The IP address is the next hierarchy above DEVICE and a single IP address can host one to many DEVICES. The customer ACCOUNT is the next hierarchy, and it encompasses one to many DEVICES owned by the customer. A range of IP address or an IP SUBNET (ASN-prefix is a regional internet area) is the next hierarchy, and it encompasses many IPs. The automated channel change sequence detection system 10235 can organize the streaming devices and their channel changes (CC) such that entropy is calculated for the most singular DEVICE or IP or ACCOUNT or IP SUBNET. The automated channel change sequence detection system 10235 can organize stream device objects in a manner such that entropy is calculated for all levels of the hierarchy. The automated channel change sequence detection system 10235 can also determine genre entropy calculations for the device hierarchy.

Figure 11:
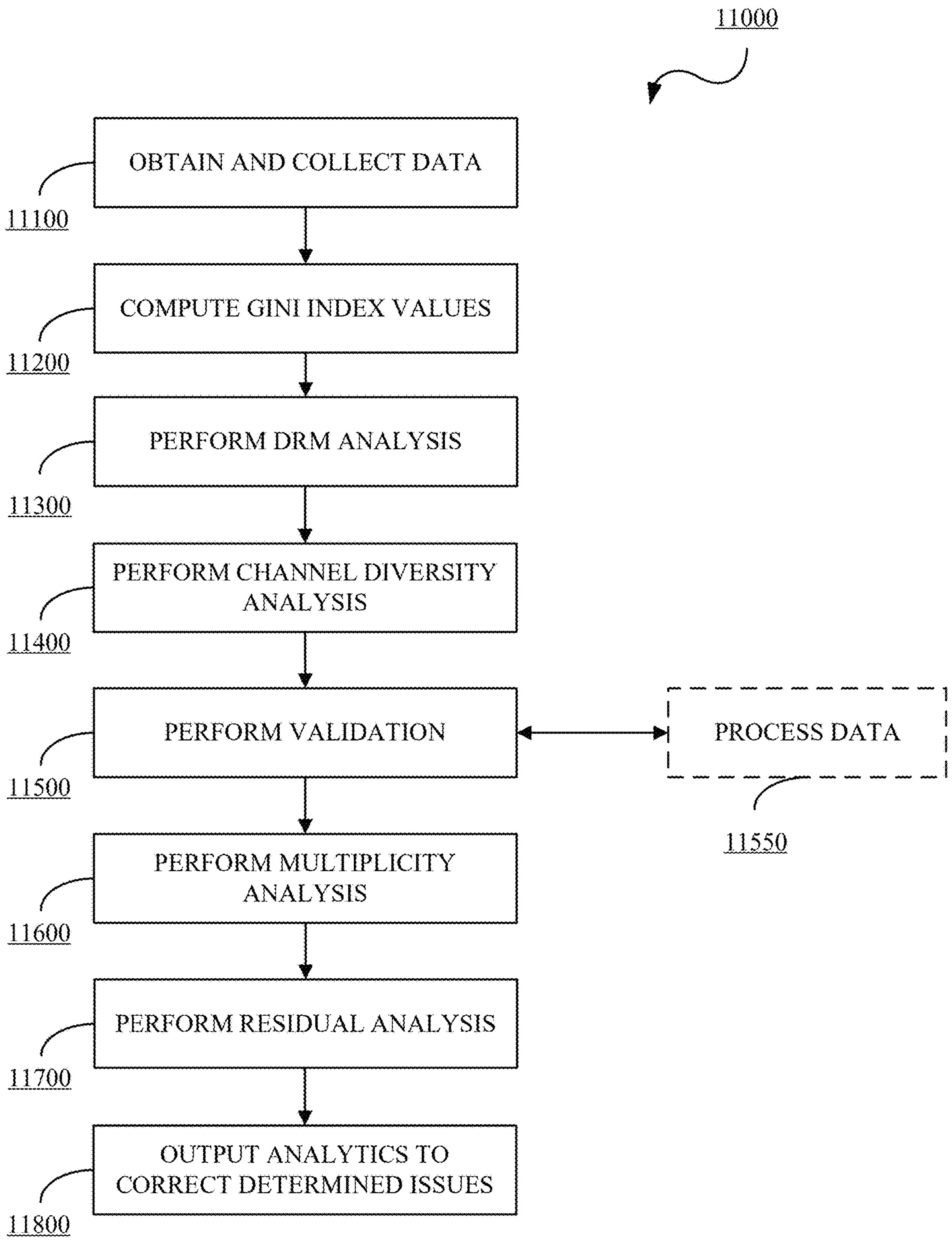
FIG. 11 is a flowchart of an example method for automated channel change detection in accordance with embodiments of this disclosure.

FIG. 11 is a flowchart of an example method 11000 for automated channel change detection in accordance with embodiments of this disclosure. The method 11000 includes: obtaining 11100 data; computing 11200 Gini index values based on the data; performing 11300 DRM analysis; performing 11400 channel diversity analysis; performing 11500 validation analysis; performing 11600 multiplicity analysis; performing 11700 residual analysis; and outputting 11800 analytics to correct determined issues. The method 11000 can be implemented, for example, in or by components described with respect to FIGS. 1-10 and 12 in conjunction with any of the flows described with respect to FIGS. 1-10, as appropriate and applicable.

The method includes obtaining 11100 data. Data is collected from users streaming content via a service provider system. The data can include, but is not limited to, DRM based data, service provider token data, channel watch data, channel change or tune data, account identification data, device identification data, IP address data, MAC address data, and/or other data related to streaming content. The data can be stored in the service provider system.

The method includes computing 11200 Gini index values based on the data. An automated channel change sequence detection system or components therein can compute channel diversity values, entropy metrics, and/or Gini index values using the data.

The method includes performing 11300 DRM analysis. The automated channel change sequence detection system or components therein can compare entropy metrics and/or Gini index values for DRM license requests, DRM license grants, and service provider tokens to determine if there is a DRM process flow issue, stolen credentials, password sharing, bots, and/or other issues.

The method includes performing 11400 channel diversity analysis. The automated channel change sequence detection system or components therein can review and determine from the entropy metrics and/or Gini index values of channel change sequences whether there is a stolen credentials issue, password sharing issue, bots issue, network error issue, and/or other issues. In implementations, higher entropy metric and/or Gini index values can indicate such issues.

The method includes performing 11500 validation analysis. The automated channel change sequence detection system or components therein can compute a Shannon entropy metric on a subset of the collected data. The validation determines whether the data collected is skewed with respect to some measure. In an illustrated example of where entropy and channel change (DRM) counts are skewed is where clients recovering from an IP network outage can redundantly repeat license requests, which skew the entropy and the license request counts to the right and up on the entropy graph. In an illustrated example of where entropy and channel change (DRM) counts are skewed is where client software bugs or a problematic client behavior can cause it to redundantly repeat DRM license requests, which skew the entropy and the license request counts to the right and up on the entropy graph. Skewed data can be processed or wrangled using machine learning techniques. In this instance, the computations and determinations can be redone using the cleaned data. The automated channel change sequence detection system or components therein can further compare entropy metrics and/or Gini index values for a channel change sequence (e.g., a channel diversity value) versus a channel watch (e.g., a channel watch value) for a subset of the data. This can provide a sanity check on the obtained results.

The method includes performing 11600 multiplicity analysis. The automated channel change sequence detection system or components therein can review the computed Gini index values against channel change count data to infer whether one or more users may be using an entry-point to stream data. Such analysis can indicate whether there are bots, MDUs, password sharing, channel zapping, and other issues.

The method includes performing 11700 residual analysis. In the instance that bots and MDUs may be indicated, the automated channel change sequence detection system or components therein can perform a temporal analysis between two similar points in the timeline. The vector length can indicate whether a bot is active (long vector) or whether it is normal behavior (short vector).

The method includes outputting 11800 analytics to correct determined issues. Determined issues and associated data can be sent by the automated channel change sequence detection system to the applicable service provider system components to correct the identified issues. This can be sent in a message, report, and/or in another format (collectively "issue message"). In implementations, the issue message can initiate an automatic correction or action by the applicable or affected service provider system component in response to the issue message.

Figure 12:
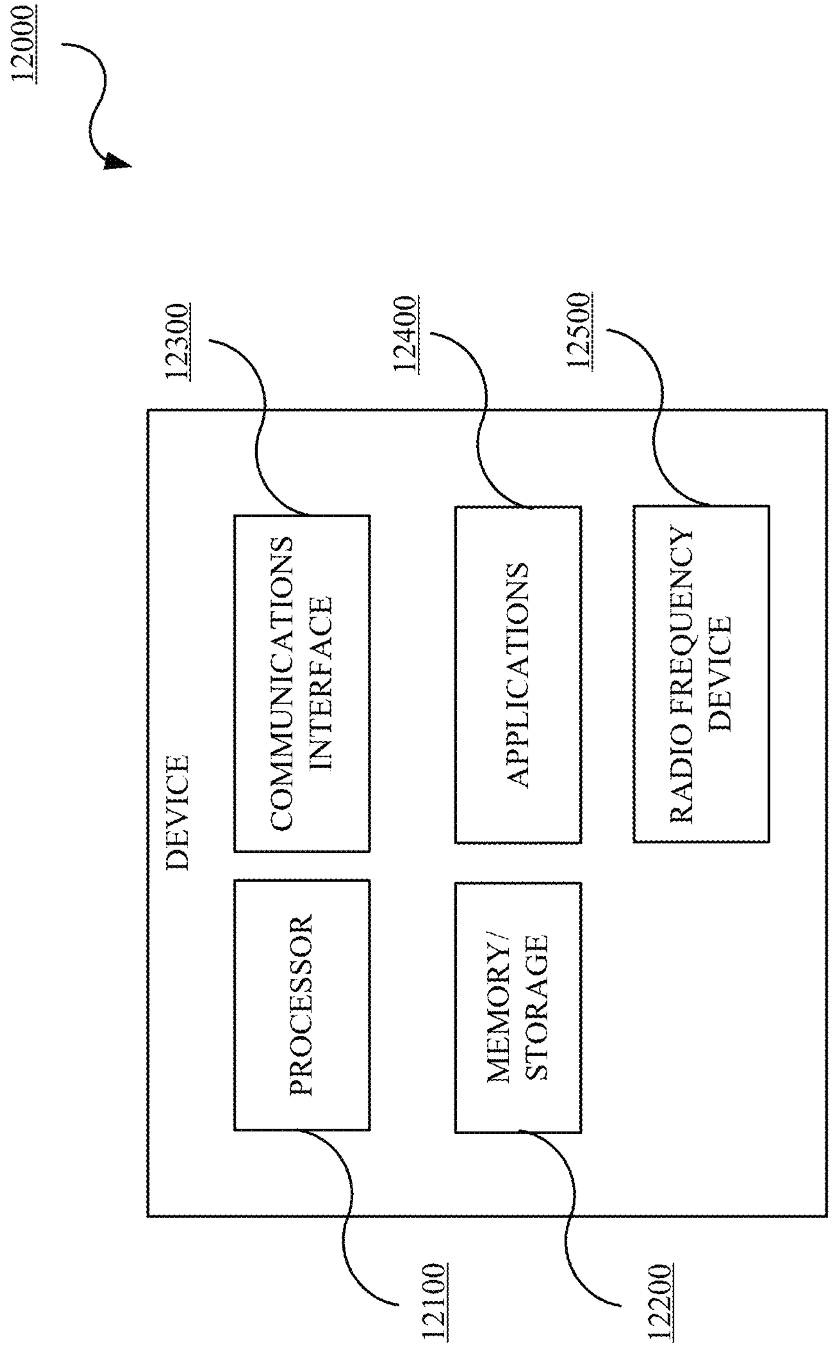
FIG. 12 is a block diagram of an example of a device in accordance with embodiments of this disclosure.

FIG. 12 is a block diagram of an example of a device 12000 in accordance with embodiments of this disclosure. The device 12000 may include, but is not limited to, a processor 12100, a memory/storage 12200, a communication interface 12300, applications 12400, and, if needed, a radio frequency device 12500. The device 12000 may include or implement, for example, the components described with respect to FIGS. 1-10. The applicable or appropriate flows, techniques, or methods described herein may be stored in the memory/storage 12200 and executed by the processor 12100 in cooperation with the memory/storage 12200, the communications interface 12300, the applications 12400, and the radio frequency device 12500 (when applicable), as appropriate. The device 12000 may include other elements which may be desirable or necessary to implement the devices, systems, and methods described herein. However, because such elements and steps do not facilitate a better understanding of the disclosed embodiments, a discussion of such elements and steps may not be provided herein.

Described herein are methods, systems, and/or devices for automated determination of issues with respect to a service provider system based on entropy of data associated with streaming content. In implementations, a method can include determining, by an automated channel change sequence detection system using an entropy-based method, a channel diversity value for channel change sequence data collected for a unique entry-point for streaming content from a service provider system, where the channel diversity value is a measure of the diversity of the channel change sequence data, reviewing, by the automated channel change sequence detection system using machine learning, at least the channel diversity value to determine an issue and outputting, by the automated channel change sequence detection system to a service provider system component associated with the determined issue, an issue message to act on the determined issue.

In implementations, the entropy-based method is a Gini index method which determines a Gini index value as the channel diversity value. In implementations, the method further includes performing, by the automated channel change sequence detection system using machine learning, a multiplicity analysis by reviewing the Gini index value against channel change count data to infer whether the issue includes that one or more users are using the unique entry-point to stream content. In implementations, the method further includes performing, by the automated channel change sequence detection system using machine learning, a temporal analysis of Gini index values and channel change count data obtained at multiple similar points in a timeline, wherein a length of a vector is indicative of bot behavior as the issue or standard behavior. In implementations, the method further includes performing, by the automated channel change sequence detection system using machine learning, an opportunity analysis by reviewing the Gini index value against channel change count data and against content type to identify advertising opportunities. In implementations, the method further includes performing, by the automated channel change sequence detection system using machine learning, an opportunity analysis by reviewing the Gini index value against channel change count data and against demographic data to identify a source of the issue. In implementations, the method further includes performing, by the automated channel change sequence detection system, a validation analysis by computing a Shannon entropy metric on a subset of the channel change sequence data to determine whether the channel change sequence data is skewed with respect to a defined measure. In implementations, the method further includes determining, by the automated channel change sequence detection system using the entropy-based method, a channel watch value for channel watch data collected for the unique entry-point, and checking, by the automated channel change sequence detection system, the channel diversity value against the channel watch data. In implementations, the method further includes determining, by the automated channel change sequence detection system using the entropy-based method, a digital rights management (DRM) license request value for DRM license request data collected for the unique entry-point. In implementations, the method further includes determining, by the automated channel change sequence detection system using the entropy-based method, a DRM license grant value for DRM license grant data collected for the unique entry-point, and comparing the DRM license request value with the DRM license grant value to determine the issue. In implementations, the method further includes determining, by the automated channel change sequence detection system using the entropy-based method, a service provider system token value for service provider system token data collected for the unique entry-point, and comparing the service provider system token value with at least one of the DRM license grant value and the DRM license request value to determine the issue.

Described herein are methods, systems, and/or devices for automated determination of issues with respect to a service provider system based on entropy of data associated with streaming content. In implementations, a system includes an automated channel change sequence detection component. The automated channel change sequence detection component configured to determine a channel diversity value using a Gini index method for channel change sequence data collected for a unique entry-point for streaming content from a service provider system, wherein the channel diversity value is a measure of the diversity of the channel change sequence data, analyze at least the channel diversity value using machine learning to determine an issue, and provide a report to an affected component of the service provider system to act on the determined issue.

In implementations, the automated channel change sequence detection component further configured to analyze, using machine learning, the channel diversity value against channel change count data to infer whether the issue is that one or more users are using the unique entry-point to stream content. In implementations, the automated channel change sequence detection component further configured to analyze, using machine learning, channel diversity values and channel change count data obtained at multiple similar points in a timeline, wherein a length of a vector is indicative of bot behavior as the issue or standard behavior. In implementations, the automated channel change sequence detection component further configured to analyze, using machine learning, the channel diversity value against channel change count data and against content type to determine advertising opportunities. In implementations, the automated channel change sequence detection component further configured to analyze, using machine learning, the channel diversity value against channel change count data and against demographic data to identify a source of the issue. In implementations, the automated channel change sequence detection component further configured to validate the channel diversity value by computing a Shannon entropy metric on a subset of the channel change sequence data to determine whether the channel change sequence data is skewed with respect to a defined measure. In implementations, the automated channel change sequence detection component further configured to determine, using the Gini index method, a channel watch value for channel watch data collected for the unique entry-point, and perform a sanity check by comparing the channel diversity value against the channel watch data. In implementations, the automated channel change sequence detection component further configured to determine, using the Gini index method, a digital rights management (DRM) license request value for DRM license request data collected for the unique entry-point, determine, using the Gini index method, a DRM license grant value for DRM license grant data collected for the unique entry-point, and compare the DRM license request value with the DRM license grant value to determine the issue. In implementations, the automated channel change sequence detection component further configured to determine, using the Gini index method, a service provider system token value for service provider system token data collected for the unique entry-point, and compare the service provider system token value with at least one of the DRM license grant value and the DRM license request value to determine the issue.

Described herein are methods, systems, and/or devices for automated determination of issues with respect to a service provider system based on entropy of data associated with streaming content. In implementations, a method includes determining, by an issue detection system, a channel diversity value using a Gini index method for channel change sequence data collected for a unique entry-point for streaming content from a service provider system, wherein the channel diversity value is a measure of the diversity of the channel change sequence data, analyzing, using machine learning, at least the channel diversity value to determine an issue, analyzing, using the machine learning, the channel diversity value against channel change count data to infer whether the issue involves one or more users using the unique entry-point to stream content, analyzing, using the machine learning, channel diversity values and channel change count data obtained at multiple similar points in a timeline to determine a length of a vector which is indicative of whether the issue is bot behavior or standard behavior, analyzing, using the machine learning, the channel diversity value against channel change count data and against content type to determine advertising opportunities, analyzing, using machine learning, the channel diversity value against channel change count data and against demographic data to identify a source of the issue, and providing, by the issue detection system, a report to an affected component of the service provider system to act on the determined issue or the advertising opportunities.

In implementations, the method further includes classifying, by the issue detection system, the channel change sequence data, determining, by the issue detection system, a genre entropy value, and characterizing, by the issue detection system, the unique entry-point using the genre entropy value.

Although some embodiments herein refer to methods, it will be appreciated by one skilled in the art that they may also be embodied as a system or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

Computer program code for carrying out operations for aspects may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the FIGURES illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGURES.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A computer-implemented method for automated determination of issues with respect to a service provider system based on entropy of data associated with streaming content, the method comprising:

determining, by an automated channel change sequence detection system using an entropy-based method, a channel diversity value for channel change sequence data collected for a unique entry-point for streaming content from a service provider system, wherein the channel diversity value is a measure of the diversity of the channel change sequence data;

reviewing, by the automated channel change sequence detection system using machine learning, at least the channel diversity value to determine an issue; and outputting, by the automated channel change sequence detection system to a service provider system component associated with the determined issue, a message with the issue.

2. The method of claim 1, wherein the entropy-based method is a Gini index method which determines a Gini index value as the channel diversity value.

3. The method of claim 2, further comprising:

performing, by the automated channel change sequence detection system using machine learning, a multiplicity analysis by reviewing the Gini index value against channel change count data to infer whether the issue includes that one or more users are using the unique entry-point to stream content.

4. The method of claim 2, further comprising:

performing, by the automated channel change sequence detection system using machine learning, a temporal analysis of Gini index values and channel change count data obtained at multiple similar points in a timeline, wherein a length of a vector is indicative of bot behavior as the issue or standard behavior.

5. The method of claim 2, further comprising:

performing, by the automated channel change sequence detection system using machine learning, an opportunity analysis by reviewing the Gini index value against channel change count data and against content type to identify advertising opportunities.

6. The method of claim 2, further comprising:

performing, by the automated channel change sequence detection system using machine learning, an opportunity analysis by reviewing the Gini index value against channel change count data and against demographic data to identify a source of the issue.

7. The method of claim 1, further comprising:

performing, by the automated channel change sequence detection system, a validation analysis by computing a Shannon entropy metric on a subset of the channel change sequence data to determine whether the channel change sequence data is skewed with respect to a defined measure.

8. The method of claim 1, further comprising:

determining, by the automated channel change sequence detection system using the entropy-based method, a channel watch value for channel watch data collected for the unique entry-point; and checking, by the automated channel change sequence detection system, the channel diversity value against the channel watch data.

9. The method of claim 1, further comprising:

determining, by the automated channel change sequence detection system using the entropy-based method, a digital rights management (DRM) license request value for DRM license request data collected for the unique entry-point;

determining, by the automated channel change sequence detection system using the entropy-based method, a DRM license grant value for DRM license grant data collected for the unique entry-point; and comparing the DRM license request value with the DRM license grant value to determine the issue.

10. The method of claim 9, further comprising:

determining, by the automated channel change sequence detection system using the entropy-based method, a service provider system token value for service provider system token data collected for the unique entry-point; and comparing the service provider system token value with at least one of the DRM license grant value and the DRM license request value to determine the issue.

11. A system, comprising:

an automated channel change sequence detection component configured to:

determine a channel diversity value using a Gini index method for channel change sequence data collected for a unique entry-point for streaming content from a service provider system, wherein the channel diversity value is a measure of the diversity of the channel change sequence data;

analyze at least the channel diversity value using machine learning to determine an issue; and provide a report with the issue to an affected component of the service provider system.

12. The system of claim 11, the automated channel change sequence detection component further configured to:

analyze, using machine learning, the channel diversity value against channel change count data to infer whether the issue is that one or more users are using the unique entry-point to stream content.

13. The system of claim 11, the automated channel change sequence detection component further configured to:

analyze, using machine learning, channel diversity values and channel change count data obtained at multiple similar points in a timeline, wherein a length of a vector is indicative of bot behavior as the issue or standard behavior.

14. The system of claim 11, the automated channel change sequence detection component further configured to:

analyze, using machine learning, the channel diversity value against channel change count data and against content type to determine advertising opportunities.

15. The system of claim 11, the automated channel change sequence detection component further configured to:

analyze, using machine learning, the channel diversity value against channel change count data and against demographic data to identify a source of the issue.

16. The system of claim 11, the automated channel change sequence detection component further configured to:

validate the channel diversity value by computing a Shannon entropy metric on a subset of the channel change sequence data to determine whether the channel change sequence data is skewed with respect to a defined measure.

17. The system of claim 11, the automated channel change sequence detection component further configured to:

determine, using the Gini index method, a channel watch value for channel watch data collected for the unique entry-point; and perform a sanity check by comparing the channel diversity value against the channel watch data.

18. The system of claim 11, the automated channel change sequence detection component further configured to:

determine, using the Gini index method, a digital rights management (DRM) license request value for DRM license request data collected for the unique entry-point;

determine, using the Gini index method, a DRM license grant value for DRM license grant data collected for the unique entry-point; and compare the DRM license request value with the DRM license grant value to determine the issue.

19. The system of claim 18, the automated channel change sequence detection component further configured to:

determine, using the Gini index method, a service provider system token value for service provider system token data collected for the unique entry-point; and compare the service provider system token value with at least one of the DRM license grant value and the DRM license request value to determine the issue.

20. A computer-implemented method for automated determination of issues with respect to a service provider system based on entropy of data associated with streaming content, the method comprising:

determining, by an issue detection system, a channel diversity value using a Gini index method for channel change sequence data collected for a unique entry-point for streaming content from a service provider system, wherein the channel diversity value is a measure of the diversity of the channel change sequence data;

analyzing, using machine learning, at least the channel diversity value to determine an issue;

analyzing, using the machine learning, the channel diversity value against channel change count data to infer whether the issue involves one or more users using the unique entry-point to stream content;

analyzing, using the machine learning, channel diversity values and channel change count data obtained at multiple similar points in a timeline to determine a length of a vector which is indicative of whether the issue is bot behavior or standard behavior;

analyzing, using the machine learning, the channel diversity value against channel change count data and against content type to determine advertising opportunities;

analyzing, using machine learning, the channel diversity value against channel change count data and against demographic data to identify a source of the issue; and providing, by the issue detection system, a report with the issue or the advertising opportunities to an affected component of the service provider system.

21. The computer-implemented method of claim 20, further comprising:

classifying, by the issue detection system, the channel change sequence data;

determining, by the issue detection system, a genre entropy value; and characterizing, by the issue detection system, the unique entry-point using the genre entropy value.

* * * * *